United States Patent [19]
Hatae et al.

[11] Patent Number: 6,091,880
[45] Date of Patent: *Jul. 18, 2000

[54] VIDEO SIGNAL PROCESSING APPARATUS

[75] Inventors: Shinichi Hatae; Teruo Hieda; Jun Makino, all of Kanagawa-ken; Shinichi Koyama, Tokyo; Kousuke Nobuoka, Kanagawa-ken, all of Japan

[73] Assignee: Canon Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/760,929

[22] Filed: Dec. 6, 1996

Related U.S. Application Data

[63] Continuation of application No. 08/315,678, Sep. 30, 1994, abandoned, which is a continuation of application No. 07/989,220, Dec. 11, 1992, abandoned.

[30] Foreign Application Priority Data

Jan. 30, 1992 [JP] Japan ..................... 4-015064

[51] Int. Cl.$^7$ .............. H04N 5/92; H04N 5/225
[52] U.S. Cl. .............................. 386/38; 386/44
[58] Field of Search ................ 358/909.1, 906; 386/38, 44, 117, 120, 121; 348/207, 222, 231, 232, 239, 252; 360/61–64; H04N 5/76, 5/78, 5/781, 5/782, 5/92, 9/79, 5/225, 5/265, 9/04

[56] References Cited

U.S. PATENT DOCUMENTS

| | | | |
|---|---|---|---|
| 4,858,012 | 8/1989 | Hino et al. ...................... | 358/909 |
| 5,016,112 | 5/1991 | Nakajima et al. ............... | 358/906 |
| 5,124,814 | 6/1992 | Takahashi et al. .............. | 358/906 |
| 5,134,487 | 7/1992 | Taguchi et al. ................. | 358/310 |
| 5,142,375 | 8/1992 | Fukuda et al. .................. | 358/310 |
| 5,159,462 | 10/1992 | Yasumura et al. .............. | 358/906 |
| 5,168,363 | 12/1992 | Kojima et al. .................. | 358/906 |
| 5,371,541 | 12/1994 | Yu .................................. | 358/906 |
| 5,598,275 | 1/1997 | Nagasawa et al. .............. | 386/117 |

*Primary Examiner*—Thai Tran
*Attorney, Agent, or Firm*—Robin, Blecker & Daley

[57] ABSTRACT

In a video signal processing apparatus provided with an image pickup part for picking up an image of an object and outputting a video signal and a reproducing part for reproducing a video signal from a recording medium, a video signal which is obtained by picking up the image of the object and a video signal which is obtained by reproducing a video signal from the recording medium are arranged to be selectively supplied to one and the same digital signal processing part. This arrangement simplifies the structural arrangement of the apparatus and yet ensures high-quality reproduction of the video signal.

15 Claims, 7 Drawing Sheets

VIDEO SIGNAL PROCESSING APPARATUS

This is a continuation application under 37 CFR 1.62 of prior application Ser. No. 08/315,678, filed Sep. 30, 1994, now abandoned which is a continuation of Ser. No. 07/989,220, filed Dec. 11, 1992, abandoned.

BACKGROUND OF THE INVENTION

1. Field of the Invention

This invention relates to a signal processing method for processing video signals.

2. Description of the Related Art

The video cameras which are now rapidly becoming popular as a result of the recent achievement of reduction in size and increase in recording density are taken up by way of example in the following description of the present specification.

Analog-to-digital (hereinafter referred to as A/D) and digital-to-analog (hereinafter referred to as D/A) converters which are capable of operating at a high speed have recently become practicable for video signal processing within a video camera as a result of the advancement of semiconductor technology. It has been, therefore, proposed to change the video signal processing action of the video camera from the conventional analog signal processing to digital signal processing.

Figure 1:
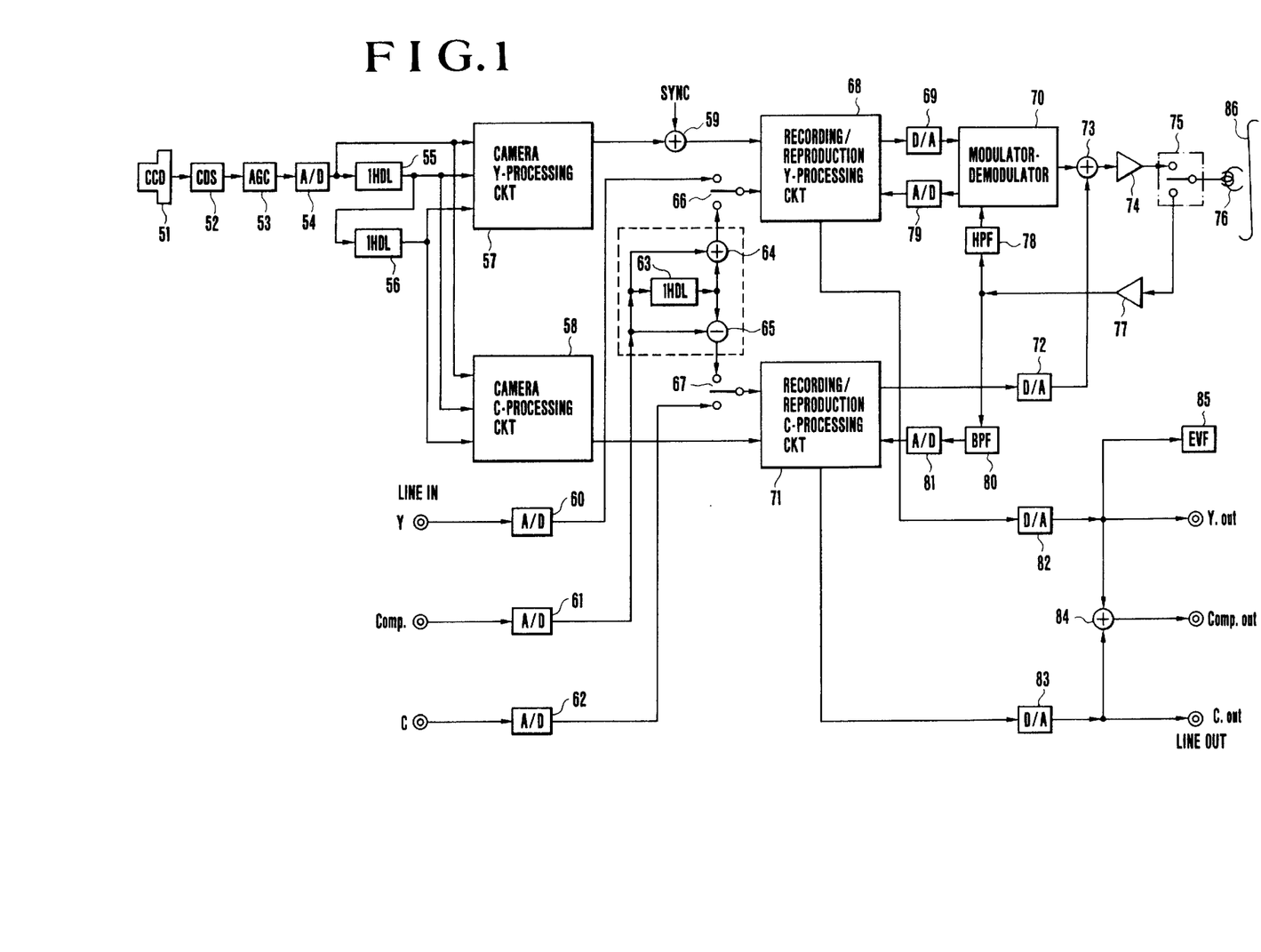
FIG. 1 is a block diagram showing the conventional video camera.

The video camera which is thus arranged to carry out digital signal processing is described below with reference to FIG. 1, which shows it in a block diagram:

In shooting and recording an image, an image is formed through a lens which is not shown. The image is photo-electrically converted by a CCD 51 into a pickup image signal. This signal is sent via a correlated double sampling circuit (hereinafter referred to as CDS) 52 and an automatic gain control circuit (hereinafter referred to as AGC) 53 to an A/D converter 54 to be converted from its analog state into a digital signal.

The digital signal is sent to one-horizontal period delay circuits (hereinafter referred to as 1HDL circuits) 55 and 56 to be delayed by them as much as one horizontal period, respectively. The delayed signals thus obtained come to a camera luminance (Y) processing circuit (hereinafter referred to as camera Y-processing circuit) 57 and a camera chrominance (C) processing circuit (hereinafter referred to as camera C-processing circuit) 58. The camera Y-processing circuit 57 forms a luminance signal from the digital-converted pickup image signal. The luminance signal is supplied to an adder 59 to have a synchronizing (hereinafter referred to as sync) signal added thereto. With the sync signal added, the luminance signal is sent to a recording/reproduction Y-processing circuit 68. The recording/reproduction Y-processing circuit 68 then performs various processes, such as an emphasizing process, etc., that are necessary for magnetic recording. The output of the circuit 68 comes to a D/A converter 69 to be converted into an analog signal. The analog signal is supplied to a frequency modulator 70 to be frequency-modulated.

Meanwhile, the camera C-processing circuit 58 forms two color-difference signals, i.e., R-Y and B-Y signals, from the digital-converted pickup image signal. The two color-difference signals are modulated into a chrominance signal. The chrominance signal is sent to a recording/reproduction C-processing circuit 71. The recording/reproduction C-processing circuit 71 then down-converts the frequency of the chrominance (C) signal, i.e., converts it into a low frequency band. The output of the C-processing circuit 71 is converted into an analog signal by a D/A converter 72.

The Y signal which has been frequency-modulated and the C signal which has been low-frequency-converted (or down-converted) are added together by an adder 73 into a composite video signal. The video signal is recorded on a video tape 86 by a recording/reproducing head 76 through a recording amplifier 74 and a change-over switch 75.

In a case where an external input image is to be recorded and the image is inputted in a state of being divided into a luminance signal and a chrominance signal, the video camera performs recording actions as follows:

The luminance (Y) signal which is included in the input from an external apparatus (not shown) is converted into a digital signal by an A/D converter 60. The digital signal is sent via a change-over switch 66 to the recording/reproduction Y-processing circuit 68. The signal processing action of the circuit 68 and the signal processing actions to be performed thereafter are the same as the signal processing actions to be performed in recording the pickup image signal as described above.

The chrominance (C) signal which is included also in the input signal from the external apparatus is converted into a digital signal by an A/D converter 62. The digital signal is sent via a change-over switch 67 to the recording/reproduction C-processing circuit 71. The signal processing actions to be performed by the circuit 71 and by other circuit elements after the circuit 71 are the same as the signal processing actions to be performed in recording the pickup image signal as described above.

Next, in recording an external input image which comes in a state of a composite video signal, the video camera performs recording actions as described below:

The input composite video signal from the external apparatus which is not shown is converted into a digital signal by an A/D converter 61. The digital signal is sent to a Y/C separation circuit which is composed of a 1HDL circuit 63, an adder 64 and a subtracter 65. The Y/C separation circuit separates the digital signal into a luminance signal and a chrominance signal. The luminance signal is sent via the change-over switch 66 to the recording/reproduction Y-processing circuit 68. Meanwhile, the chrominance signal is sent via the change-over switch 67 to the recording/reproduction C-processing circuit 71. The processes to be performed by the Y-processing and C-processing circuits 68 and 71 and by other circuit elements after the circuits 68 and 71 are the same as the processes to be performed in recording the pickup image signal.

The processes to be performed by the video camera for reproduction are as described below:

A signal recorded on the video tape 86 is read out by the recording/reproducing head 76. The output of the recording/reproducing head 76 comes via the change-over switch 75 to a head amplifier 77 to be amplified up to a given level. The reproduced signal thus amplified comes to a high-pass filter (hereinafter referred to as HPF) 78 and a band-pass filter (hereinafter referred to as BPF) 80. A frequency-modulated luminance signal is separated by the HPF 78. The luminance signal is demodulated by a demodulator 70 and converted into a digital signal by an A/D converter 79. The digital signal is sent to the recording/reproduction Y-processing circuit 68 to be subjected to processes which are performed in a manner reverse to the processes performed in recording.

A down-converted chrominance signal is separated by the BPF 80. The chrominance signal is sent to the recording/reproduction C-processing circuit 71 to be subjected to processes which are performed in a manner reverse to the processes performed in recording.

The luminance and chrominance signals which are thus converted into their original states are converted into analog signals respectively by D/A converters 82 and 83 in the state of being separated from each other. These analog signals are outputted either as they are from Y and C output terminals of a part LINE OUT or combined together by an adder 84 to be outputted as a composite video signal from a composite output terminal of the part LINE OUT.

Further, the luminance signal which is converted into an analog signal by the D/A converter 82 is outputted also to an electronic viewfinder (hereinafter referred to as EVF) 85, so that it can be used for monitoring.

With respect to the video signal processing, various processing circuits are necessary for a high picture quality and a high resolution in addition to the circuits for fundamental signal processing. For example, although the down-converted chrominance signal does not interfere directly with the frequency-modulated luminance signal, the carrier wave "fo" of the luminance signal and the frequency "fL" of the down-converted chrominance signal bring forth a signal component of a frequency "fo-2fL", which overlaps the luminance signal to lower the picture quality at the time of magnetic reproduction. Therefore, a filter is added to attenuate the frequency component "fo-2fL" (hereinafter referred to as the suppression of a Y-2C component) for improvement in the picture quality of the reproduced signal. Further, a contour emphasis circuit for emphasizing the contour of the reproduced luminance signal and a time delay circuit for correcting a phase difference between the reproduced luminance signal and the reproduced chrominance signal are arranged after the D/A converter 82 for attaining a high picture quality.

However, any arrangement to digitally carry out the above-stated signal processing operation of the video camera necessitates the provision of an A/D converter in the signal input part and a D/A converter on the side of signal output. Therefore, although the details of the signal processing operation are equivalent to those of the analog signal processing operation, the number of necessary component parts is increased by as much as the parts added for digital processing. Further, in the digital processing circuit arrangement, each of image pickup, recording and reproducing systems are also arranged to use circuits which are arranged discretely from those of other systems. In addition to this, the provision of the circuits for a high picture quality causes a further increase in scale of the circuit arrangement, which is disadvantageous in respect to a reduction in cost and size.

SUMMARY OF THE INVENTION

Such being the background situation, it is an object of this invention to provide a video signal processing apparatus which solves the above-stated problem of the prior art and is capable of forming a high quality image without increasing the number of component parts.

To attain this object, a video signal processing apparatus arranged as a preferred embodiment of this invention comprises: image pickup means arranged to pick up an image of an object and to generate a first video signal which includes a first color signal according to image pickup information on the object; reproducing means for reproducing a second video signal from a recording medium; color signal forming means for forming a second color signal from the second video signal reproduced by the reproducing means; digital conversion means for converting a video signal into a digital signal; multiplexing means for time-divisionally multiplexing a digital color signal; and supply means for selectively supplying to the multiplexing means either the first color signal digital-converted by the digital conversion means or the second color signal digital-converted by the digital conversion means.

A video signal processing apparatus arranged as another preferred embodiment of this invention comprises: image pickup means arranged to pick up an image of an object and to generate a first video signal according to image pickup information on the object; reproducing means for reproducing a second video signal from a recording medium; correction means for correcting a phase difference between a luminance signal and a chrominance signal included in a video signal; and supply means for selectively supplying to the correction means either the first video signal or the second video signal.

A video signal processing apparatus arranged as a further preferred embodiment of the invention comprises: image pickup means arranged to pick up an image of an object and to generate a first video signal according to image pickup information on the object; reproducing means for reproducing a second video signal from a recording medium; signal processing means for performing a signal processing action on a video signal; and supply means for selectively supplying to the signal processing means either the first video signal or the second video signal, the signal processing means having a function of suppressing a color carrier included in the first video signal and a function of suppressing a beat component brought forth by luminance and chrominance signals included in the second video signal.

A video signal processing apparatus arranged as a further preferred embodiment of the invention comprises: image pickup means arranged to photo-electrically convert an optically formed image into an electrical signal and to output the electrical signal; external input means for permitting external input of a video signal; and sampling means for selectively sampling the electrical signal outputted from the image pickup means or the video signal inputted from the external input means.

A video signal processing apparatus arranged as a still further preferred embodiment of this invention to have, in one unified body, an image pickup part arranged to pick up an image of an object and to generate a video signal representative of the image and a reproducing part arranged to reproduce a video signal recorded on a recording medium, comprises: image pickup means arranged to pick up an image of an object and to generate a first video signal representative of the image; reproducing means for reproducing a second video signal from a recording medium on which video signals are recorded; digital conversion means for converting a video signal into a digital signal; signal processing means for performing a signal processing action on the video signal digital-converted by the digital conversion means; and supply means for selectively supplying to the signal processing means either the first video signal digital-converted by the digital-conversion means or the second video signal digital-converted by the digital conversion means.

The above and other objects and advantages of the invention will become apparent from the following detailed description of embodiments thereof taken in conjunction with the accompanying drawings.

DETAILED DESCRIPTION OF THE PREFERRED EMBODIMENTS

The details of a video camera which is arranged according to this invention as a first embodiment thereof are described below with reference to FIGS. 2 and 3.

Figure 2:
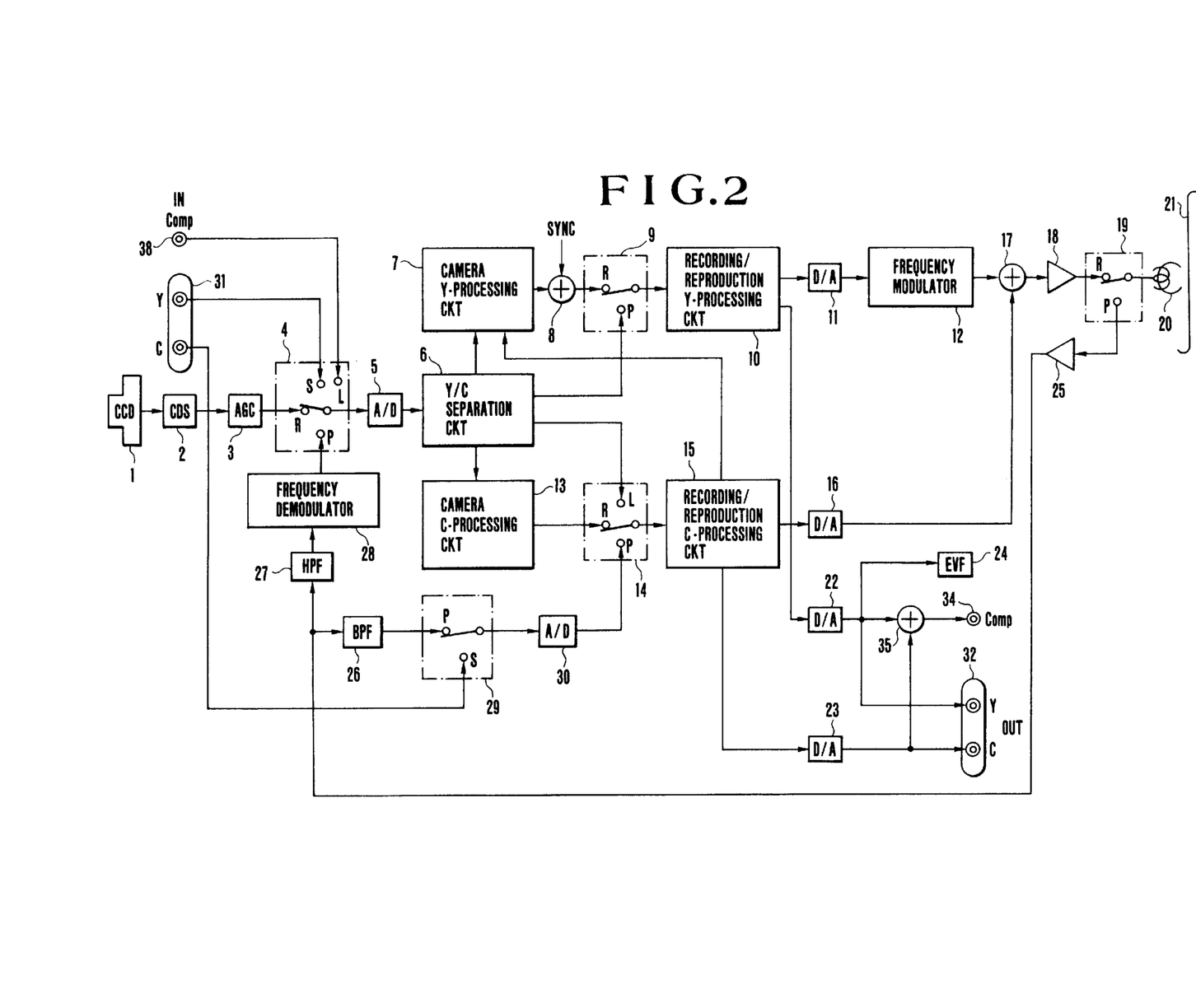
FIG. 2 is a block diagram showing a video camera arranged as a first embodiment of this invention.

FIG. 2 is a block diagram showing the video camera arranged as the first embodiment of the invention. FIG. 3 is a block diagram showing the details of a camera Y-processing circuit of the video camera shown in FIG. 2.

Referring to FIG. 2, a CCD 1 which is a color image sensor has minute color separating filters formed on the image pickup plane thereof. The illustration includes a CDS 2, an AGC 3, and change-over switches 4, 9, 14, 19 and 29 which operate under the control of a system control circuit (not shown) according to instructions given by a mode selection switch, etc., which are not shown.

Each of A/D converters 5 and 30 is arranged to convert an analog input signal into a digital signal which consists of 8 or 9 bits. A Y/C separation circuit 6 is provided with two 1HDL circuits and is arranged to separate an input signal into a luminance signal and a chrominance signal in recording an external input in a case where the external input is a composite video signal.

A camera luminance processing (or Y-processing) circuit 7 is arranged to form a luminance signal from a pickup image signal which is photo-electrically converted by the CCD 1 and to perform various processes on the luminance signal, including a gamma correction process, a black-and-white clipping process, a blanking signal adding process, etc. An adder 8 is arranged to add a sync signal SYNC to the output of the camera Y-processing circuit 7. A recording/reproduction Y-processing circuit 10 includes preemphasis, deemphasis and clipping circuits.

Each of D/A converters 11, 16, 22 and 23 is arranged to convert a digital signal of 8 to 10 bits into an analog signal. A frequency modulator 12 is arranged to narrow-band-frequency-modulate the luminance signal into a given band. A camera chrominance processing (or C-processing) circuit 13 is arranged to form two color-difference signals (R-Y and B-Y signals) from the pickup image signal photo-electrically converted by the CCD 1 and to process the two color-difference signals into a chrominance signal by carrying out various processes on the color-difference signals, including a gamma correction process, a color-difference matrix process, an orthogonal modulation process and a burst adding process. A recording/reproduction chrominance processing (or C-processing) circuit 15 is arranged to carry out emphasis, deemphasis, color-phase inversion and frequency converting processes.

An adder 17 is arranged to add the frequency-modulated luminance signal and the down-converted chrominance signal together. Reference numeral 18 denotes a recording video amplifier. Reference numeral 20 denotes a recording/reproducing head. Reference numeral 21 denotes a magnetic tape employed as a recording medium. Reference numeral 24 denotes an electronic viewfinder (hereinafter referred to as EVF) which is arranged to be used for monitoring an image pickup plane or a reproduced image plane. Reference numeral 25 denotes a video amplifier for reproduction.

A BPF (band-pass filter) 26 is arranged to separate a low-frequency signal (chrominance signal) included in the input signal. An HPF (high-pass filter) 27 is arranged to separate a high-frequency signal (luminance signal) included in the input signal. A frequency demodulator 28 is arranged to demodulate the frequency-modulated luminance signal. A separation-type video input terminal (hereinafter referred to as S input terminal) 31 is arranged to receive luminance and chrominance signals separately from each other. A separation-type video output terminal (hereinafter referred to as S output terminal) 32 is arranged to output luminance and chrominance signals separately from each other. A composite video signal input terminal (hereinafter referred to as video input terminal) 33 is arranged to receive a composite video signal input. A composite video signal output terminal (hereinafter referred to as video output terminal) 34 is arranged to output a composite video signal. Reference numeral 35 denotes an adder.

Figure 3:
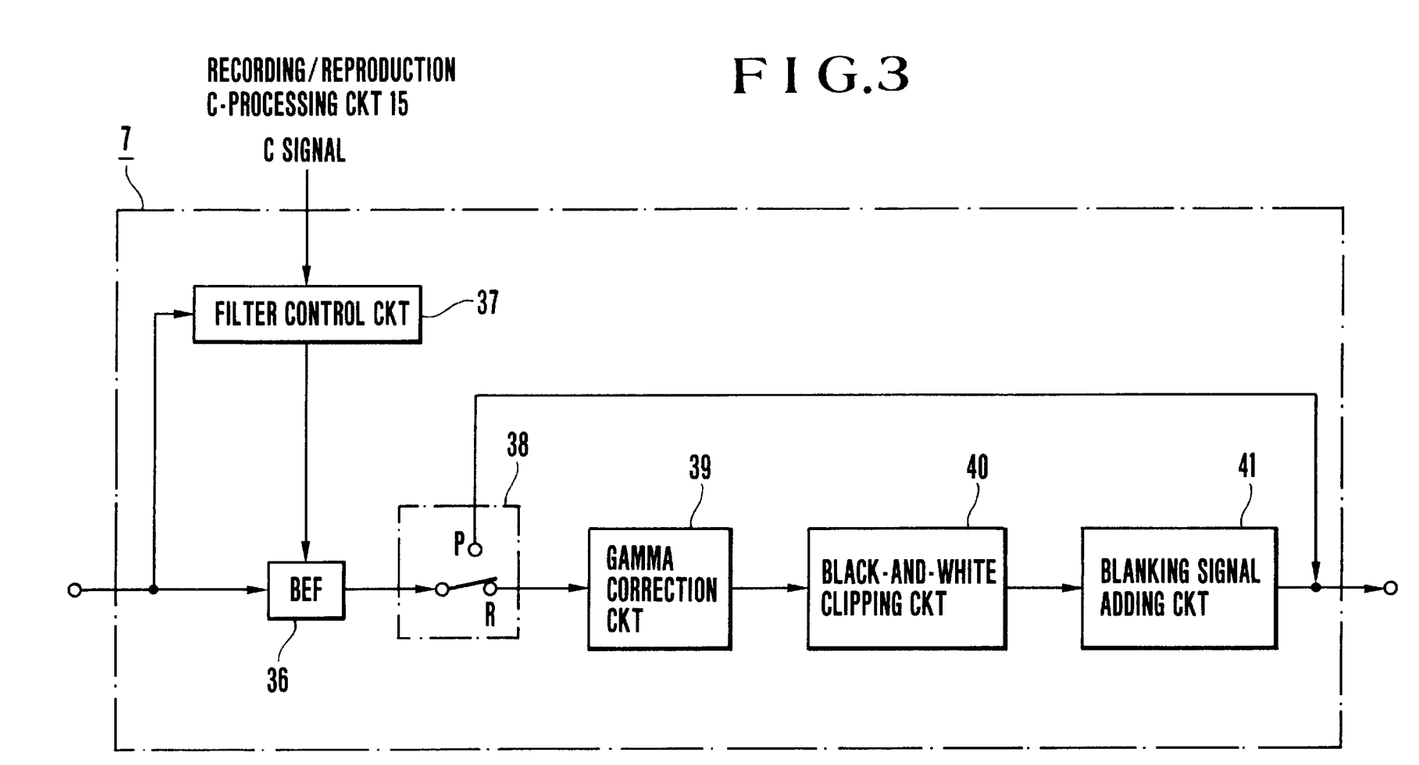
FIG. 3 is a block diagram showing the details of an essential part of the video camera shown in FIG. 2.

Referring to FIG. 3 which shows the details of the camera Y-processing circuit 7, a band elimination filter (hereinafter referred to as BEF) 36 is arranged to remove a carrier wave component from the output signal of the CCD 1. The filtering action of the BEF 36 is controlled by a filter control circuit 37 and is performed for the suppression of a Y-2C component at the time of reproduction. The illustration includes a change-over switch 38, a gamma correction circuit 39, a black-and-white clipping circuit 40, and a blanking signal adding circuit 41.

All circuits, change-over switches, etc., that form the video camera are arranged to operate under the control of a system control circuit which is not shown.

In picking up and recording an image, the video camera arranged as described above operates as follows.

An image of an object is formed on the image pickup plane of the CCD 1 by a photo-taking optical system which is not shown. The image is photo-electrically converted by the CCD 1. A video signal thus obtained is subjected to predetermined processes through the CDS 2 and the AGC 3. The signal thus processed is sent to the A/D converter 5 via the change-over switch 4 which is connected to one side R thereof. The A/D converter 5 converts the signal into a digital signal. The digital signal is sent to the Y/C separation circuit 6.

The digital signal input to the Y/C separation circuit 6 is delayed by delay circuits (two horizontal periods) within the circuit 6. Signals obtained by this delaying process are respectively sent to the camera Y-processing circuit 7 and the camera C-processing circuit 12. The camera Y-processing circuit 7 is arranged as shown in FIG. 3.

Referring to FIG. 3, at the camera Y-processing circuit 7, a luminance signal is formed from the input signal by removing the carrier wave component of the output signal of the CCD 1 through the BEF 36. The luminance signal thus formed is subjected to a gamma correction process, a black-and-white clipping process and a blanking signal adding process. In this case, a given coefficient is applied from the filter control circuit 37 to the BEF 36 in such a way as to suppress the carrier wave component of the output signal of the CCD 1.

After these processes, the adder 8 adds a sync signal to the luminance signal. With the sync signal added thereto, the luminance signal is sent via the change-over switch 9 (connected to one side R thereof) to the recording/reproduction Y-processing circuit 10.

The recording/reproduction Y-processing circuit 10 then performs the processes necessary for recording, including the preemphasis and clipping processes. The output of the circuit 10 is converted into an analog signal by the D/A converter 11. The analog signal is frequency-modulated by the frequency modulator 12. The output of the frequency modulator 12 comes to the adder 17 to be added together with the down-converted chrominance signal which will be described later. The output of the adder 17 is sent via the recording video amplifier 18 and the change-over switch 19 (connected to one side R) to the recording/reproducing head 20 to be recorded on the video tape 21.

Meanwhile, the camera C-processing circuit 13 forms two color-difference signals (R-Y and B-Y signals) from the input signal and then performs gamma correction, color-difference matrix, orthogonal modulation and burst adding processes to create a chrominance signal by modulating the two color-difference signals. After the signal processing action, the output of the circuit 13 is sent via the change-over switch 14 (connected to one side R) to the recording/reproduction C-processing circuit 15. The circuit 15 converts the frequency of the processed chrominance signal into a low frequency band and further performs preemphasis and color-phase inversion processes which are necessary for recording. The output of the recording/reproduction C-processing circuit 15 is converted into an analog signal by the D/A converter 16. The analog chrominance signal comes to the adder 17 to be added together with the frequency-modulated luminance signal as mentioned above.

In recording an external input image which is in a state of having a luminance signal and a chrominance signal separated from each other, the video camera performs a recording operation as follows.

An input signal from an external apparatus which is not shown is received at the S input terminal 31. A luminance signal included in the input signal is sent via the change-over switch 4 (connected to one side S) to the A/D converter 5 to be converted into a digital signal. The digital signal comes to the Y/C separation circuit 6. In this instance, the Y/C separation circuit 6 performs no process on the signal. The signal is sent from the circuit 6 to the recording/reproduction Y-processing circuit 10 via the change-over switch 9 (connected to one side P). The processes to be performed at the circuit 10 and thereafter are the same as the processes performed in recording the pickup image signal as described in the foregoing.

A chrominance signal which is also included in the external input signal comes via the change-over switch 29 (connected to one side S) to the A/D converter 30 to be converted into a digital signal. The digital signal comes via the change-over switch 14 (connected to one side P) to the recording/reproduction C-processing circuit 15. The processes to be performed at the circuit 15 and thereafter are the same as the processes performed in recording the pickup image signal as described in the foregoing.

In recording an external input image, which is inputted in the form of a composite video signal, the video camera performs a recording operation as follows.

The input composite video signal from an external apparatus which is not shown is received at the video input terminal 33. The signal then comes via the change-over switch 4 (connected to one side L) to the A/D converter 5 to be converted into a digital signal. The digital signal comes to the Y/C separation circuit 6. The Y/C separation circuit 6 then separates the input signal into a luminance signal and a chrominance signal.

The separated luminance signal is sent via the change-over switch 9 (connected to one side P) to the recording/reproduction Y-processing circuit 10. Meanwhile, the separated chrominance signal is sent via the change-over switch 14 (connected to one side L) to the recording/reproduction C-processing circuit 15.

The signal processing actions on the luminance signal to be performed at the recording/reproduction Y-processing circuit 10 and thereafter are the same as those performed in recording the pickup image signal as described in the foregoing. The signal processing actions on the chrominance signal to be performed at the recording/reproduction C-processing circuit 15 and thereafter are also the same as those performed in recording the pickup image signal.

Next, the reproducing operation of the video camera is described as follows.

A signal recorded on the video tape 21 is read out by the recording/reproducing head 20. The output of the head 20 is sent via the change-over switch 19 (connected to one side P) to the head amplifier 25 to be amplified up to a given level. The amplified signal first comes to the BPF 26 to have a down-converted chrominance signal separated therefrom. The chrominance signal thus separated is sent via the change-over switch 29 (connected to one side P) to the A/D converter 30 to be converted into a digital signal. The digital signal is sent via the change-over switch 14 (connected to one side P) to the recording/reproduction C-processing circuit 15. At the circuit 15, processes necessary for reproduction including deemphasis, color-phase inversion and frequency conversion processes, are carried out in a manner reverse to the processes performed in recording.

The output of the recording/reproduction C-processing circuit 15 is converted into an analog signal by the D/A converter 23. The analog signal is outputted to the outside from the S output terminal 32. Further, the output of the recording/reproduction C-processing circuit 15 is sent also to the camera recording/reproduction Y-processing circuit 7.

Meanwhile, the frequency-modulated luminance signal included in the output of the head amplifier 25 is separated by the HPF 27. The luminance signal then comes to the frequency demodulator 28 to be demodulated. The demodulated luminance signal is sent via the change-over switch 4 (connected to one side P) to the A/D converter 5 to be converted into a digital signal. The digital signal comes to the Y/C separation circuit 6. The luminance signal is not processed by the circuit 6 and is sent from the circuit 6 to the camera Y-processing circuit 7.

The operation to be performed within the camera Y-processing circuit 7 is described with reference to FIG. 3 as follows: Within the camera Y-processing circuit 7, the luminance signal from the Y/C separation circuit 6 and the chrominance signal from the recording/reproduction C-processing circuit 15 are inputted to the filter control circuit 37. The filter control circuit 37 controls the BEF 36 by obtaining a filter characteristic suited to the suppression of the Y-2C component according to the states of the luminance (Y) signal and the chrominance (C) signal inputted. Therefore, the Y-2C component of the luminance signal inputted to the camera Y-processing circuit 7 is suppressed by the BEF 36 under the above-stated control. After that, the luminance signal is sent via the change-over switch 9

(connected to one side R) to the recording/reproduction Y-processing circuit 10. The circuit 10 then performs a deemphasis process which is necessary for reproduction.

The output of the recording/reproduction Y-processing circuit 10 is converted into an analog signal by the D/A converter 22. The analog signal is outputted to the outside from the S output terminal 32.

The adder 35 adds together the analog-converted luminance signal and the analog-converted chrominance signal to combine them into a composite signal. The composite signal can be outputted to the outside from the video output terminal 39. Further, the analog-converted luminance signal is inputted also to the EVF 24, so that the reproducing operation can be monitored.

A video camera which is arranged according to the invention as a second embodiment thereof is described in detail below with reference to FIGS. 4, 5, 6 and 7.

Figure 4:
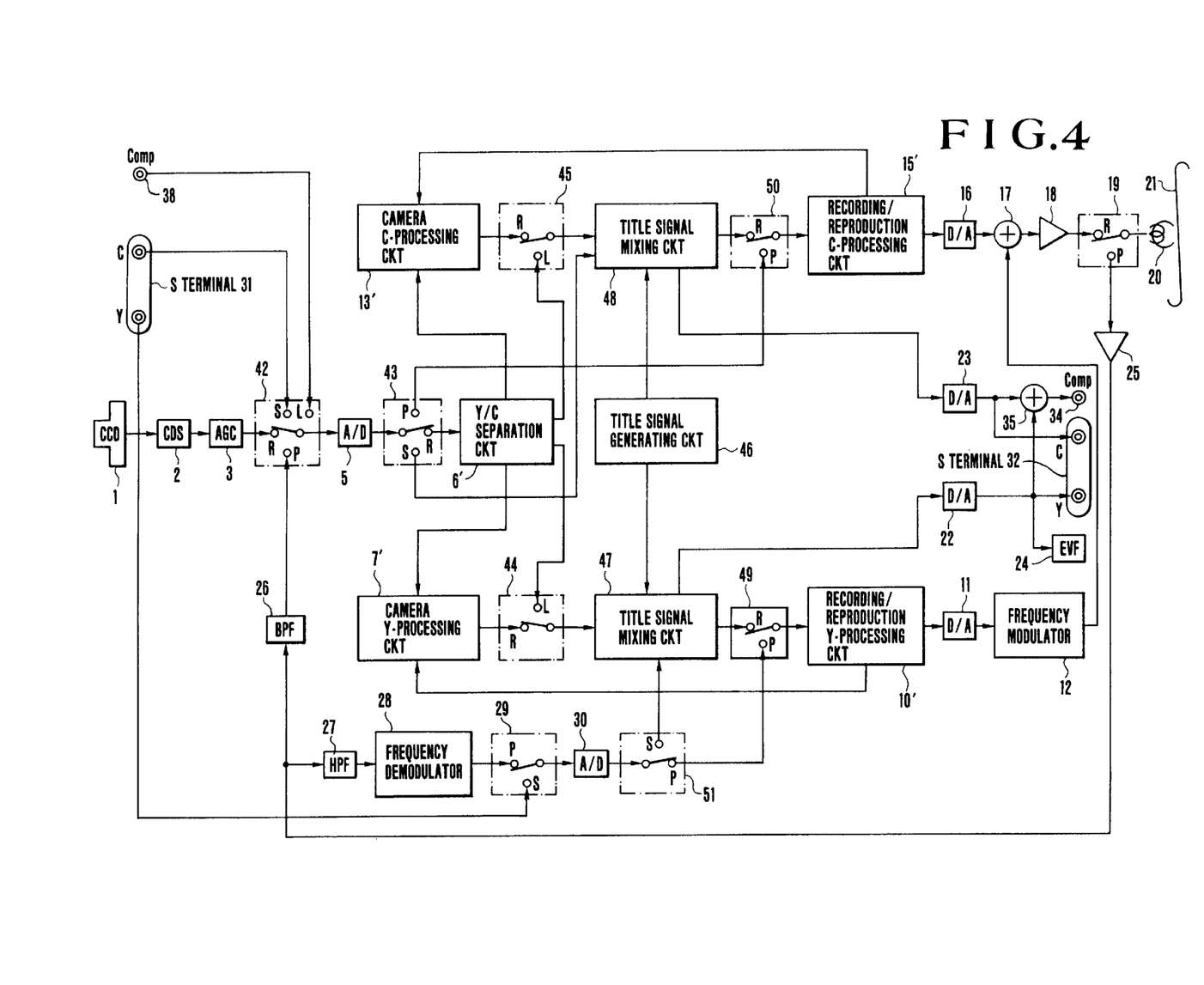
FIG. 4 is a block diagram showing a video camera arranged as a second embodiment of this invention.
Figure 5:
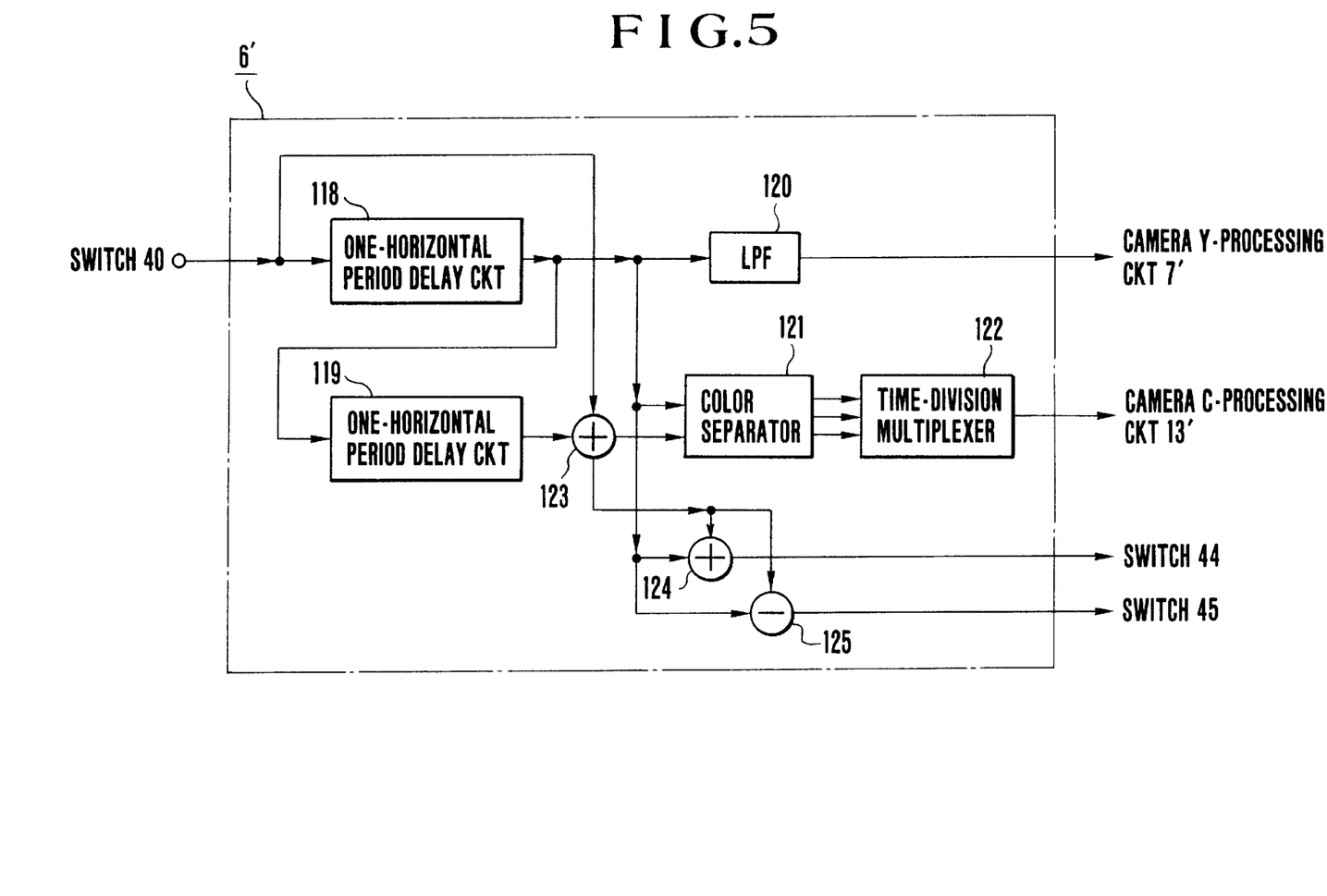
FIG. 5 is a block diagram showing the details of an essential part of the video camera shown in FIG. 4.
Figure 6:
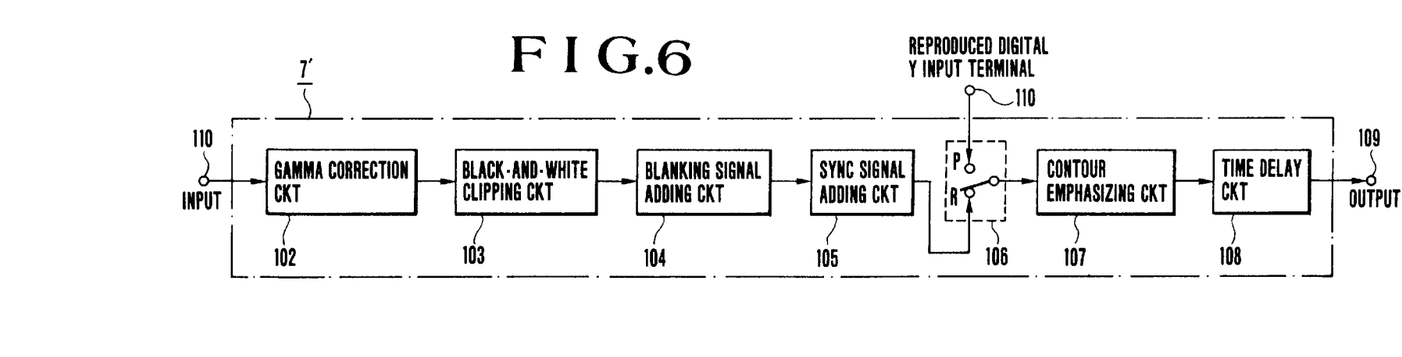
FIG. 6 is a block diagram showing the details of another essential part of the video camera of FIG. 4.
Figure 7:
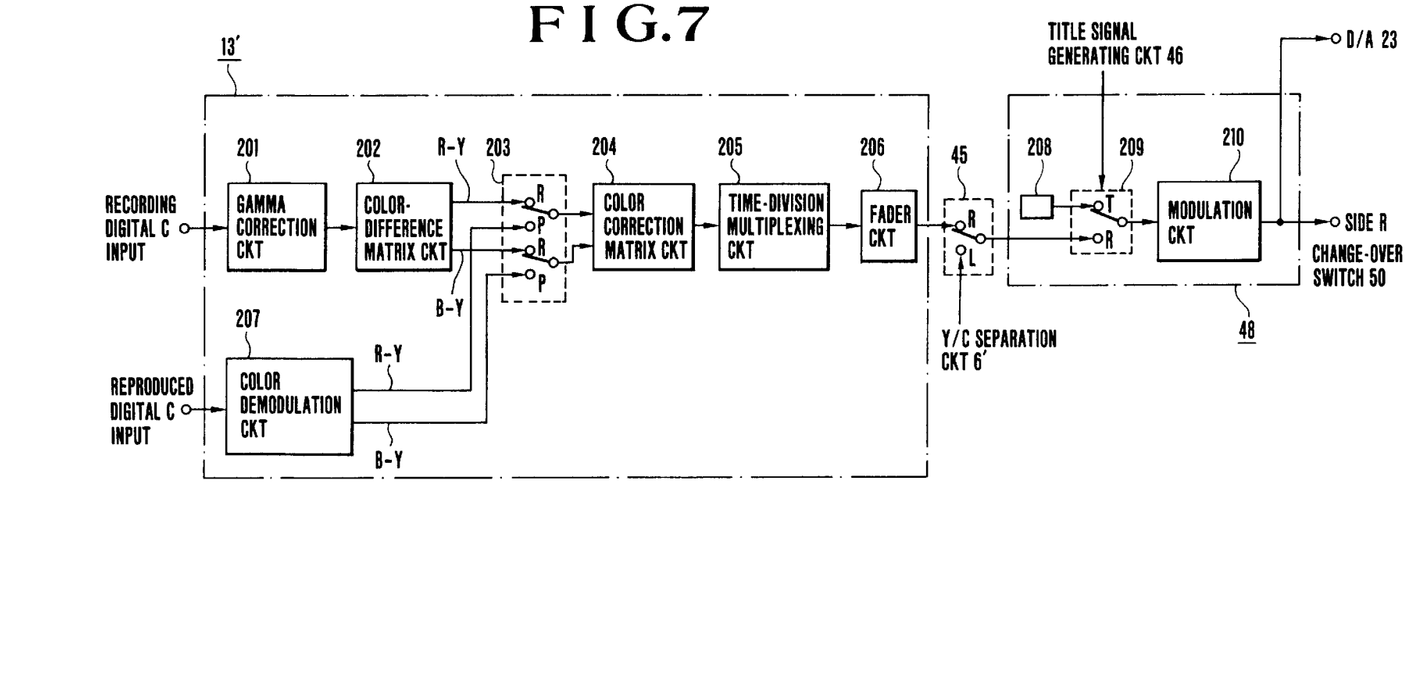
FIG. 7 is a block diagram showing the details of further essential parts of the video camera of FIG. 4.

FIG. 4 is a block diagram showing the video camera arranged as the second embodiment. FIG. 5 is a block diagram showing the details of a Y/C separation circuit shown in FIG. 4. FIG. 6 is a block diagram showing the details of a camera Y-processing circuit which is shown in FIG. 4. FIG. 7 is a block diagram showing the details of an essential part of FIG. 4. Further, in FIG. 4, the same parts as those of FIG. 2 are indicated by the same reference numerals and the details of these parts are omitted from the following description.

Referring to FIG. 4, in the video camera, change-over switches 42, 43, 44, 45, 49, 50 and 51 are arranged to perform their switching actions under the control of a system control circuit which is not shown, according to an instruction given from a mode selection switch which is also not shown. A title signal generating circuit 46 is arranged to generate a given color title signal in accordance with an instruction from the system control circuit. Each of title signal mixing circuits 47 and 48 is arranged to mix the title signal with a recording signal or with a reproduced signal. With these title mixing circuits 47 and 48 added to the circuit arrangement, a camera Y-processing circuit 7', a camera C-processing circuit 13', a recording/reproduction Y-proessing circuit 10', a recording/reproduction C-processing circuit 15' and a Y/C separation circuit 6' are arranged to perform their processing actions in a manner different from those of the circuits indicated by the same names in FIG. 2.

In FIG. 5 which shows the details of the Y/C separation circuit 6', reference numerals 118 and 119 denote 1HDL circuits. A low-pass filter (LPF) 120 is arranged to pass only a luminance signal included in a pickup image signal. A color separator 121 includes a synchronous detector and a matrix circuit and is arranged to form primary color signals for primary colors red (R), green (G) and blue (B) from the pickup image signal. A time-division multiplexer 122 is arranged to time-divisionally multiplex the R, G and B signals. Reference numerals 123 and 124 denote adders. Reference numeral 125 denotes a subtracter.

In FIG. 6 which shows the details of the camera Y-processing circuit 7', the illustration includes a pickup image signal input terminal 101, a gamma correction circuit 102, a black-and-white clipping circuit 103, a blanking signal adding circuit 104, a sync signal adding circuit 105, a change-over switch 106; a contour emphasizing circuit 107 which is arranged to emphasize the edge part of an image, and a time delay circuit 108 which is arranged to correct a phase difference caused by a discrepancy in signal processing time between the luminance and chrominance signals.

The signal processing time discrepancy results, for example, from a difference in processing time between the BPF and the HPF.

In FIG. 7, reference numerals 201 to 207 denote circuit elements included in the block of the camera C-processing circuit 13'. The circuit 13' includes a gamma correction circuit 201, a color-difference matrix circuit 202 which is arranged to form color-difference signals (R-Y and B-Y signals) by means of a matrix from the time-divided primary color signals, a change-over switch 203, a color correction matrix circuit 204 which is arranged to correct color by matrix-processing the two color-difference signals inputted, a time-division multiplexing circuit 205 which time-divisionally multiplexes the digital color-difference signals in a dot-sequential manner, a fader circuit 206, and a color demodulation circuit 207 which is arranged to generate color-difference signals by demodulating a reproduced chrominance signal.

Circuit elements 208 to 210 are disposed within the block of the title signal mixing circuit 48. The circuit 48 includes a register 208 which is of a fixed value, a change-over switch 209 which is arranged to do a switching action according to an instruction given from the title signal generating circuit 46, and a modulation circuit 210 which is arranged to modulate the color-difference signals with a color subcarrier.

All the circuits, change-over switches, etc., that form the video camera are arranged to be controlled by a system control circuit which is not shown.

In picking up and recording an image, the video camera arranged as described above operates as follows.

An image of an object to be recorded is formed on the image pickup plane of the CCD 1 through a photo-taking optical system which is not shown. The image is photo-electrically converted into a pickup image signal by the CCD 1. The pickup image signal comes via the CDS 2, the AGC circuit 3 and the change-over switch 42 (connected to one side R) to the A/D converter 5 to be converted into a digital signal. The digital signal is sent via the change-over switch 43 (connected to one side R) to the Y/C separation circuit 6'.

Referring to FIG. 5 which shows the Y/C separation circuit 6', the pickup image signal input is delayed one horizontal period by the 1HDL circuit 118. After that, only a luminance signal included in the pickup image signal is passed by the LPF 120. The luminance signal is sent to the camera Y-processing circuit 7'.

The output of the 1HDL circuit 118 is delayed further by another 1HDL circuit 119. A signal which is thus delayed a total of 2 horizontal periods and the signal which is not delayed are added together by the adder 123. The output of the adder 123 is sent to the color separator 121 together with the output of the 1HDL circuit 118. The color separator 121 then detects a plurality of color signals by a synchronous detecting action from the two input signals and further performs a matrix process to obtain primary color signals R, G and B.

The primary color signals R, G and B are time-divisionally multiplexed by the time-division multiplexer 122 and are sent to the camera C-processing circuit 13' as a chrominance signal. Meanwhile, the luminance signal outputted from the Y/C separation circuit 6' is inputted to the camera Y-processing circuit 7' which is arranged as shown in detail in FIG. 6.

Referring to FIG. 6, at the camera Y-processing circuit 7', the luminance signal outputted from the Y/C separation circuit 6' is processed by the gamma correction circuit 102, the black-and-white clipping circuit 103, the blanking signal adding circuit 104 and the sync signal adding circuit 105. After that, the luminance signal is sent via the change-over switch 106 (connected to one side R) to the contour emphasizing circuit 107 to have its contour part emphasized. The luminance signal then comes to the time delay circuit 108 to have a phase difference between the luminance and chrominance signals of the pickup image signal corrected there. After that, the signal is outputted from the output terminal 109.

The luminance signal thus processed is sent via the change-over switch 44 (connected to one side R) to the title mixing circuit 47 to be mixed with a title luminance signal generated by the title signal generating circuit 46. The output of the title signal mixing circuit 47 is sent via the change-over switch 49 (connected to one side R) to the recording/reproduction Y-processing circuit 10'.

The recording/reproduction Y-processing circuit 10' then performs the preemphasis and clipping processes which are necessary for recording. The output of the circuit 10' is converted into an analog signal by the D/A converter 11. The analog signal is frequency-modulated by the frequency modulator 12. The frequency-modulated luminance signal and a down-converted chrominance signal which will be described later are added together at the adder 17. The output of the adder 17 is sent via the change-over switch 19 (connected to one side R) to the recording/reproducing head 20 to be recorded on the video tape 21. Meanwhile, the chrominance signal outputted from the Y/C separation circuit 6' is inputted to the camera C-processing circuit 13', which is shown in FIG. 7.

Within the camera C-processing circuit 13' (see FIG. 7), the chrominance signal from the Y/C separation circuit 6' is subjected to a gamma correction process performed by the gamma correction circuit 201, and is then converted into color-difference signals R-Y and B-Y by the color-difference matrix circuit 202. The color-difference signals R-Y and B-Y come to the change-over switch 203.

The change-over switch 203 is connected to its sides R by the system control circuit (not shown) to send the color-difference signals to the color correction matrix circuit 204. The circuit 204 then corrects the colors of the color-difference signals in accordance with a correction coefficient set by the system control circuit which is not shown. The color-corrected color-difference signals come to the time-division multiplexing circuit 205 to be time-divisionally multiplexed in a dot sequential manner. The output of the circuit 205 comes to the fader circuit 206 to be faded in accordance with a fade signal coming from a control system which is not shown. The chrominance signal which is thus processed is inputted via the change-over switch 45 (connected to one side R) to the title signal mixing circuit 48.

In a case where a title signal is inputted from the title signal generating circuit 46, the change-over switch 209 within the title signal mixing circuit 48 is connected to one side T. In this instance, a title chrominance signal is composed with the above-stated input chrominance signal replaced with a given value set at the register 208. The title chrominance signal is modulated with a color subcarrier by the modulation circuit 210 before it is outputted from the circuit 48.

The signal outputted from the title signal mixing circuit 48 is sent via the change-over switch 47 (connected to one side R) to the recording/reproduction C-processing circuit 15'. The circuit 15' then performs preemphasis and color-phase inversion processes which are necessary for recording. The output of the circuit 15' is converted into an analog signal by the D/A converter 16. The analog chrominance signal thus obtained comes to the adder 17 to be added together with the frequency-modulated luminance signal as mentioned above.

Further, the outputs of the title signal mixing circuits 47 and 48 are also sent respectively to the D/A converters 22 and 23 to be converted into analog signals. Then, the luminance signal and the chrominance signal are combined with each other by the adder 35 and outputted from the video output terminal 34. The luminance signal and the chrominance signal are also outputted from the S output terminal 32 in a state of being separated from each other. With an external apparatus such as a TV set or the like connected to the output terminal, therefore, the image carried by these signals can be monitored. Further, since the luminance signal analog-converted by the D/A converter 22 is also inputted to the EVF 24, the image can be monitored by the video camera operator.

In a case where an external input image which is inputted in a state of having luminance and chrominance signals separated from each other is to be recorded, the video camera performs the recording operation as follows:

The input signal which comes from an apparatus which is not shown is inputted to the S input terminal 31. The luminance signal included in the input signal comes via the change-over switch 29 (connected to one side S) to the A/D converter 30 to be converted into a digital signal. The digital luminance signal comes via the change-over switch 51 (connected to one side S) to the title signal mixing circuit 47. Processes to be performed at the title signal mixing circuit 47 and thereafter are similar to the processes performed in recording the pickup image signal as described in the foregoing.

Meanwhile, the chrominance signal which is also included in the input signal comes via the change-over switch 42 (connected to one side S) to the A/D converter 5 to be converted into a digital signal. The digital signal comes via the change-over switch 43 (connected to one side S) to the title signal mixing circuit 48. Processes to be performed at the title signal mixing circuit 48 and thereafter are also similar to the processes performed in recording the pickup image signal.

In recording an external input image which is inputted in a state of a composite video signal, the recording operation is performed as described below.

The composite video signal which comes from an external apparatus which is not shown is inputted to the video input terminal 33. The input signal comes via the change-over switch 42 (connected to one side L) to the A/D converter 5 to be converted into a digital signal. The digital signal is sent via the change-over switch 43 (connected to one side R) to the Y/C separation circuit 6', which is arranged as shown in FIG. 5.

Referring to FIG. 5, with the composite video signal inputted to the Y/C separation circuit 6', a signal is obtained by delaying the input signal through the 1HDL circuit 118. Another signal is obtained through the adder 123 by adding together the input signal which is not delayed and a signal which is obtained by further delaying the delayed signal through the 1HDL circuit 119. The delayed signal and said another signal are added together by the adder 124. Through this process, the chrominance component is removed from the input signal. The output of the adder 124 is sent to the change-over switch 44 as a luminance signal. Further, the luminance component of the input signal is removed from the input signal by carrying out a subtracting operation on these signals at the subtracter 125. The output of the subtracter 125 is sent to the change-over switch 45 as a chrominance signal.

The luminance signal outputted from the Y/C separation circuit 6' is sent via the change-over switch 44 (connected to one side L) to the title signal mixing circuit 47. Processes to be performed at the title signal mixing circuit 47 and thereafter are similar to the processes performed in recording the pickup image signal as described in the foregoing.

The chrominance signal outputted from the Y/C separation circuit 6' is sent via the change-over switch 45 (connected to one side L) to the title signal mixing circuit 48. Processes to be performed at the title signal mixing circuit 48 and thereafter are similar to the processes performed in recording the pickup image signal.

Next, in reproducing a recorded signal, the video camera operates as described below.

The signal recorded on the video tape 21 is read out by the recording/reproducing head 20. The output of the head 20 comes via the change-over switch 19 (connected to one side P) to the head amplifier 25 to be amplified to a given level. A down-converted chrominance signal is first separated from the amplified signal by the BPF 26. The chrominance signal separated comes via the change-over switch 42 (connected to one side P) to the A/D converter 5 to be converted into a digital signal. The digital signal passes through the change-over switch 43 (connected to one side P) and comes via the change-over switch 50 (connected to one side P) to the recording/reproduction C-processing circuit 15'. At the circuit 15', processes necessary for reproduction, including deemphasis, color-phase inversion and frequency converting processes, are carried out. The output of the recording/reproduction C-processing circuit 15' is sent to the camera C-processing circuit 13'.

Referring to FIG. 7, at the camera C-processing circuit 13', the chrominance signal is demodulated into color-difference signals (R-Y and B-Y signals) by the color demodulation circuit 207. The color-difference signals are sent via the change-over switch 203 (connected to one side P) to the color correction matrix circuit 204. Processes to be performed at the color correction matrix circuit 204 and thereafter are similar to the processes which are performed in recording the pickup image signal as described in the foregoing.

The chrominance signal outputted from the camera C-processing circuit 13' is sent via the change-over switch 45 (connected to one side R) to the title signal mixing circuit 48. At the title signal mixing circuit 48, the chrominance signal is processed in the same manner as in the case of recording the pickup image signal described in the foregoing. The chrominance signal thus processed is converted into an analog signal by the D/A converter 23. The analog chrominance signal thus obtained is outputted to the outside from the S output terminal 32.

Meanwhile, a frequency-modulated luminance signal included in the output of the head amplifier 25 is separated by the HPF 27 and is then demodulated by the frequency demodulator 28. The demodulated luminance signal comes via the change-over switch 29 (connected to one side P) to the A/D converter 30 to be converted into a digital signal. The digital signal passes through the change-over switch 51 (connected to one side P) and then comes via the change-over switch 49 (connected to one side P) to the recording/reproduction Y-processing circuit 10'. At the circuit 10', a deemphasizing process which is necessary for reproduction is carried out. The output of the recording/reproduction Y-processing circuit 10' is inputted to the camera Y-processing circuit 7'.

Referring to FIG. 6, at the camera Y-processing circuit 7', the luminance signal comes via the change-over switch 106 (connected to one side P) to the coner to emphasizing circuit 107 to have its contour part emphasized. After the contour emphasizing circuit 107, the luminance signal comes to the time delay circuit 108 to have a time discrepancy between the reproduced luminance signal and the reproduced chrominance signal corrected there. After that, the luminance signal is outputted from the output terminal 109. The luminance signal thus processed comes via the change-over switch 44 (connected to one side R) to the title signal mixing circuit 47. At the circuit 47, a title signal is mixed with the luminance signal. The output of the title signal mixing circuit 47 is converted into an analog signal by the D/A converter 22. The analog signal is then outputted to the outside from the S output terminal 32.

Further, the analog-converted luminance and chrominance signals are combined into a composite video signal by the adder 35. The composite video signal is outputted also from the video output terminal 34.

Meanwhile, the luminance signal which is analog-converted by the D/A converter 22 is also supplied to the EVF 24 for monitoring.

A video camera which is arranged also according to this invention as a third embodiment thereof is described with reference to FIG. 8 as follows.

Figure 8:
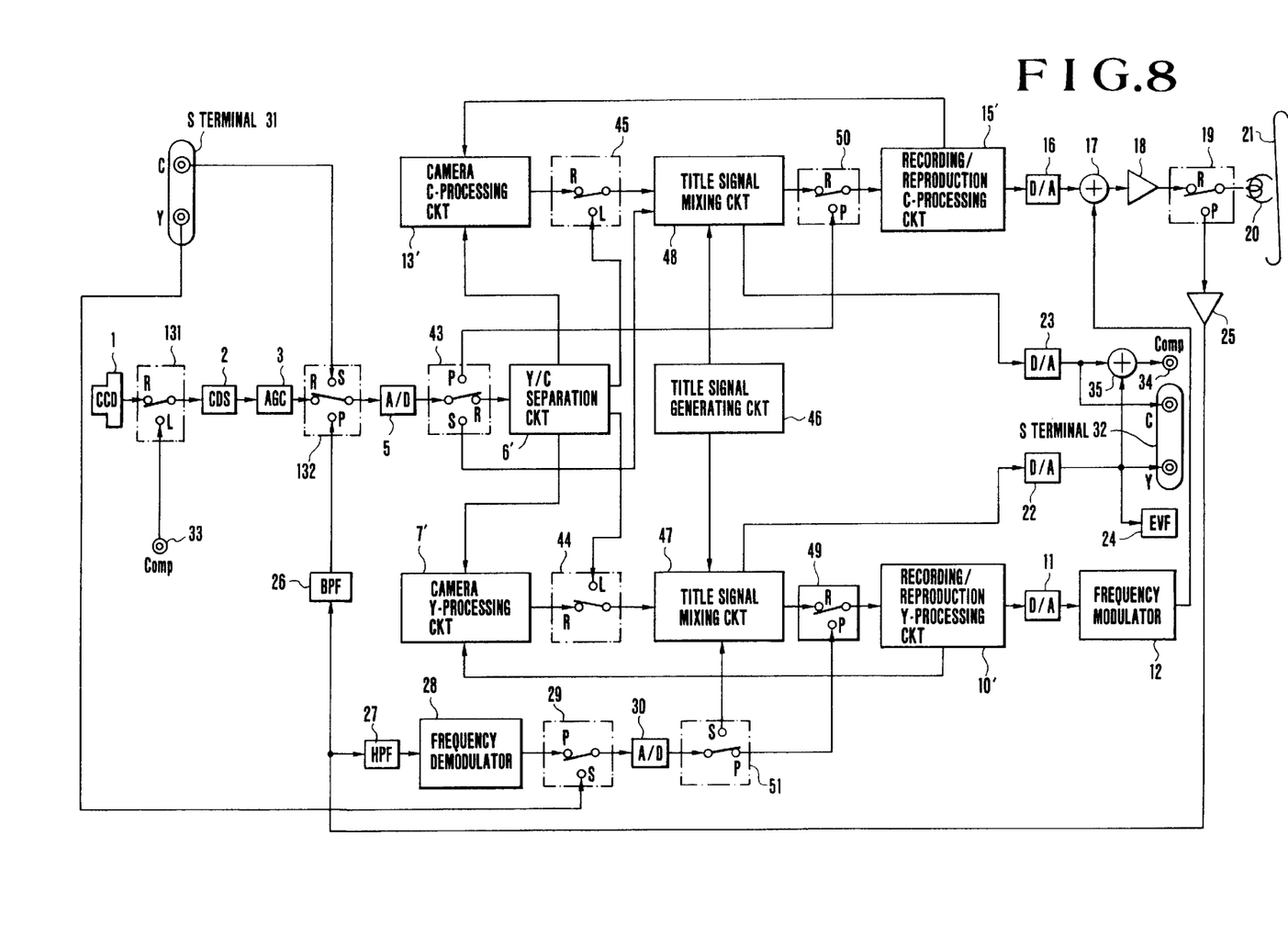
FIG. 8 is a block diagram showing a video camera arranged as a third embodiment of this invention.

In FIG. 8, the same parts as those of FIG. 4 are indicated by the same reference numerals and the details of them are omitted from the following description. As shown in FIG. 8, the third embodiment is arranged to have a composite video signal inputted before the CDS 2, so that amplitude fluctuations of the input video signal can be removed in the event of a line input.

At the time of the image pickup and recording operation, change-over switches 131 and 132 are connected to their sides R. With the exception of that, the third embodiment operates in the same manner as the second embodiment in this instance.

In recording an external input image, which is in a state of having luminance and chrominance signals inputted separately from each other, the third embodiment operates in the same manner as the second embodiment with the exception that the change-over switch 132 is connected to its one side S.

In recording an external input image, which is inputted in a state of a composite video signal, the third embodiment operates in the same manner as the second embodiment with the exception that the change-over switch 131 is connected to another side L and the change-over switch 132 is connected to another side R.

The reproducing operation of the third embodiment is performed in the same manner as the second embodiment with the exception that the change-over switch 132 is connected to one side P thereof.

In accordance with the arrangement of each of the embodiments described, the time delay circuit for correcting a phase difference between the luminance and chrominance signals and the time-division multiplexing circuit for time-divisionally multiplexing the two digital color-difference signals can be used for processing both a video signal coming from the video camera and a video signal reproduced. Further, the filter for forming a luminance signal from the pickup image signal is arranged to be used for the purpose of suppressing the Y-2C component at the time of reproduction. The arrangement of using some circuits in common for signal processing actions of the recording system and those of the reproducing system permits a reduction in number of necessary component parts, so that the scale of the circuit arrangement can be lessened. Therefore, electric energy consumption, the number of adjusting points and the cost of manufacture can be reduced.

Many embodiments of this invention may be variously made without departing from the spirit and essential features thereof. For example, while the title signal mixing circuits are used in the case of the second and third embodiments described, other functional circuits for enhancing the video effect, such as digital recording and reproduction by means of a field memory, mosaic processing for attaining a special effect, mirror inversion, negative-positive inversion, and an electronic image stabilizing process for correcting image plane vibrations by detecting a vibrating component of the image plane and by moving the image plane accordingly, and so on, may be included in the circuit arrangement either in place of the title signal mixing circuits 47 and 48 or in addition to them.

In other words, the foregoing description of embodiments has been given for illustrative purpose only and not to be construed as imposing any limitation in every respect.

The scope of the invention is, therefore, to be determined solely by the following claims and not limited by the text of the specification. Any alterations made within a scope equivalent to the scope of the claims fall within the true spirit and scope of the invention.

What is claimed is:

1. A video signal processing apparatus comprising:
    a) image sensing means arranged to pick up an image of an object and to generate a first video signal corresponding to said object;
    b) generating means for generating a first color-difference signal from the first video signal;
    c) reproducing means for reproducing a second video signal from a recording medium;
    d) color demodulation means for generating a second color-difference signal by demodulating the second video signal;
    e) color correction means for effecting selective color correction of the first color-difference signal and the second color-difference signal,
        said color correction means performing color correction with respect to the first color-difference signal and the second color-difference signal by using a common circuit; and
    f) multiplexing means for effecting timesharing multiplexing of the color-difference signal which is color-corrected by said color correction means.

2. An apparatus according to claim 1, further comprising video signal adding means for adding a third video signal to a video signal, said video signal adding means being arranged to be supplied selectively with the first video signal or the second video signal.

3. An apparatus according to claim 1, further comprising fading means for fading a video signal, said fading means being arranged to be supplied selectively with the first video signal or the second video signal.

4. An apparatus according to claim 1, further comprising edge emphasizing means for emphasizing an edge component of a video signal, said edge emphasizing means being arranged to be supplied selectively with the first video signal or the second video signal.

5. An apparatus according to claim 1, further comprising recording means arranged to form a recording signal by using the first color-difference signal which has been converted into a multiplex signal by said multiplexing means and to record the recording signal on the recording medium.

6. An apparatus according to claim 5, wherein said color correction means is arranged to correct the first color-difference signal during the time when said recording means is operating and to correct the second color-difference signal during the time when said reproducing means is operating.

7. An apparatus according to claim 1, wherein said color correction means is arranged to correct the first color-difference signal during the time when the first video signal is being generated from said image sensing means and to correct the second color-difference signal during the time when the second video signal is being reproduced by said reproducing means.

8. An apparatus according to claim 1, further comprising conversion means for effecting digital conversion of the first video signal.

9. An apparatus according to claim 8, further comprising external input means for permitting external input of a third video signal, said conversion means being arranged to be supplied selectively with the first video signal or the third video signal.

10. A method of processing video signals, comprising the steps of:
    a) generating a first video signal corresponding to an object image sensed by image sensing means;
    b) generating a first color-difference signal from the first video signal;
    c) reproducing a second video signal from a recording medium;
    d) demodulating the second video signal to generate a second color-difference signal;
    e) selectively color-correcting the first color-difference signal and the second color-difference signal; and
    f) effecting timesharing multiplexing of the color-difference signal which is color-corrected at said color-correction step.

11. A method according to claim 10, further comprising the step of adding a third video signal to the first video signal or the second video signal.

12. A method according to claim 10, further comprising the step of fading the first video signal or the second video signal.

13. A method according to claim 10, further comprising the step of emphasizing an edge component of the first video signal or the second video signal.

14. A method according to claim 10, further comprising the steps of forming a recording signal by using the first color-difference signal which has been converted into a multiplex signal in said multiplexing step and recording the recording signal on the recording medium.

15. A method according to claim 14, further comprising the step of effecting digital conversion of the first video signal or the second video signal.

* * * * *

UNITED STATES PATENT AND TRADEMARK OFFICE
CERTIFICATE OF CORRECTION

PATENT NO. : 6,091,880
DATED : July 18, 2000
INVENTOR(S) : Shinichi Hatae et al.

It is certified that error appears in the above-identified patent and that said Letters Patent is hereby corrected as shown below:

Column 1,
Line 31, delete "diagram:" and insert -- diagram --.

Column 2,
Line 34, delete "below:" and insert -- below. --.
Line 51, delete "below:" and insert -- below. --.

Column 8,
Line 56, delete "follows:" and insert -- follows. --.

Column 12,
Line 23, delete "follows:" and insert -- follows. --.

Column 14,
Line 6, delete "coner to" and insert -- contour --.

Column 15,
Line 42, delete "color demodulation" and insert -- color difference signal generating --.
Line 43, delete "by demodulating" and insert -- from --.

Column 16,
Lines 39 and 40, delete "demodulating the second video signal to generate a second color-difference signal;" and insert -- generating a second color-difference signal from the second video signal; --.

Signed and Sealed this

Twelfth Day of February, 2002

*Attest:*

*Attesting Officer*

JAMES E. ROGAN
*Director of the United States Patent and Trademark Office*